US011770035B2

(12) United States Patent
Schunk (10) Patent No.: US 11,770,035 B2
(45) Date of Patent: Sep. 26, 2023

(54) LAMINATED CORE FOR AN ELECTRIC MACHINE

(71) Applicant: Siemens Aktiengesellschaft, Munich (DE)

(72) Inventor: Holger Schunk, Lendershausen (DE)

(73) Assignee: Siemens Aktiengesellschaft, Munich (DE)

( * ) Notice: Subject to any disclaimer, the term of this patent is extended or adjusted under 35 U.S.C. 154(b) by 192 days.

(21) Appl. No.: 17/435,966

(22) PCT Filed: Feb. 10, 2020

(86) PCT No.: PCT/EP2020/053314
§ 371 (c)(1),
(2) Date: Sep. 2, 2021

(87) PCT Pub. No.: WO2020/177984
PCT Pub. Date: Sep. 10, 2020

(65) Prior Publication Data
US 2022/0149678 A1    May 12, 2022

(30) Foreign Application Priority Data
Mar. 6, 2019  (EP) .................................. 19161065

(51) Int. Cl.
*H02K 1/16* (2006.01)
*H02K 1/26* (2006.01)
(Continued)

(52) U.S. Cl.
CPC ............. *H02K 1/165* (2013.01); *H02K 1/265* (2013.01); *H02K 3/48* (2013.01); *H02K 3/46* (2013.01)

(58) Field of Classification Search
CPC ............ H02K 1/16; H02K 1/165; H02K 1/26; H02K 1/265; H02K 3/46; H02K 3/48; H02K 3/487
(Continued)

(56) References Cited

U.S. PATENT DOCUMENTS 5,349,742 A    9/1994 Nolle
2004/0212256 A1    10/2004 Sugishima et al.
(Continued)

FOREIGN PATENT DOCUMENTS

| DE | 10 2014 111 239 A1 | 2/2016 |
|---|---|---|
| DE | 10 2016 114 569 A1 | 2/2018 |
| JP | S61285037 A | 12/1986 |

OTHER PUBLICATIONS

PCT International Search Report and Written Opinion of International Searching Authority dated Jun. 4, 2020 corresponding to PCT International Application No. PCT/EP2020/053314 filed Feb. 10, 2020.

*Primary Examiner* — Rashad H Johnson
(74) *Attorney, Agent, or Firm* — Henry M. Feiereisen LLC (57) ABSTRACT

A laminated core for a rotor and/or a stator of a rotating electric machine includes teeth arranged adjacent to one another in a peripheral direction of the laminated core and delimiting slots for accommodating an electrical conductor that forms a winding. A cover unit is arranged on a side of an air gap between the rotor and the stator and delimits the slots in the radial direction. The cover unit has in a region of a respective one of the slots at least two tapering regions which are spaced apart from one another in the peripheral direction of the laminated core, with a material of the cover unit being thinner in the tapering regions in a radial direction (Continued)

of the laminated core than in a region of the cover unit adjoining the tapering regions.

17 Claims, 5 Drawing Sheets

(51) Int. Cl.
*H02K 3/48* (2006.01)
*H02K 3/46* (2006.01)

(58) Field of Classification Search
USPC .... 310/216.004, 216.005, 216.007, 216.057, 310/216.062, 216.074
See application file for complete search history.

(56) References Cited

U.S. PATENT DOCUMENTS

| | | | |
|---|---|---|---|
| 2011/0025165 A1* | 2/2011 | Naganawa | H02K 3/487 |
| | | | 310/216.069 |
| 2011/0198962 A1* | 8/2011 | Tang | H02K 3/28 |
| | | | 310/216.069 |
| 2011/0210692 A1* | 9/2011 | Nishihama | H02K 17/165 |
| | | | 310/211 |
| 2011/0248595 A1* | 10/2011 | Krotsch | H02K 29/03 |
| | | | 310/156.46 |
| 2017/0229929 A1 | 8/2017 | Fahrenbach | |
| 2017/0288476 A1* | 10/2017 | Fischer | H02K 1/24 |
| 2019/0173330 A1 | 6/2019 | Moros | |
| 2020/0381972 A1* | 12/2020 | Momen | H02K 7/006 |

\* cited by examiner

LAMINATED CORE FOR AN ELECTRIC MACHINE

CROSS-REFERENCES TO RELATED APPLICATIONS

This application is the U.S. National Stage of International Application No. PCT/EP2020/053314, flied Feb. 10, 2020, which designated the United States and has been published as International Publication No. WO 2020/177984 A1 and which claims the priority of European Patent Application, Serial No. 19161065.8, filed Mar. 6, 2019, pursuant to 35 U.S.C. 119(a)-(d).

BACKGROUND OF THE INVENTION

The invention relates to a laminated core for a rotor and/or a stator of a rotating electric machine having an air gap between the rotor and the stator, with teeth which are arranged adjacent to one another in a peripheral direction of the laminated core and delimit slots for accommodating at least one electrical conductor that forms at least one winding, and a cover unit arranged on the air gap side which delimits the slots in the radial direction, wherein the cover unit has at least one tapering region in a region of a respective slot, in which a material of the cover unit is thinner in a radial direction of the laminated core than in a region of the cover unit adjoining said tapering region. Moreover, the invention also relates to a stator for the rotating electric machine as well as a rotor for the rotating machine. Finally, the invention relates to a rotating electric machine with a stator and a rotor that is arranged such that it is rotatably mounted in an opening of the stator, wherein the stator is spaced apart from the rotor by an air gap.

Generic electric machines, stators and rotors as well as laminated cores for this purpose are well known in principle in the prior art, so that a separate documented verification is not required for this purpose. A rotating electric machine involves an apparatus which in motor operation converts electrical energy into mechanical energy, in particular kinetic (movement) energy and/or in generator operation converts mechanical energy into electrical energy. The movement generally involves a rotational movement, which is carried out by the rotor in relation to the stator. Unlike the rotor, the stator is generally arranged in a torsion-resistant manner, in other words the rotational movement involves a rotational movement of the rotor in relation to the stator.

In the rotating electric machine, the stationary part is generally provided as a stator, which usually provides a substantially circular opening for accommodating the rotating part embodied as a rotor. The rotor is arranged such that it is rotatably mounted about an axis of rotation of the rotor in the opening, wherein an air gap is formed between the rotor and the stator. The axis of rotation often also corresponds to a longitudinal axis of the rotor or of the electric machine or of the stator.

During intended operation of the electric machine, the stator and the rotor are interlinked by means of a magnetic flux, by way of which the force action, namely the torque, is generated during motor operation, which drives the rotor to rotate in relation to the stator. During generator operation, the mechanical energy supplied to the rotor in the form of a rotation or a torque is converted into electrical energy. For this purpose, the stator and the rotor generally each have a winding through which an electrical current flows. In the stator or in the rotor, the winding can also be formed by a permanent magnet or supplemented by such a permanent magnet.

Rotating electric machines of the generic type are for example induction machines, which are connected to a multi-phase, in particular three-phase electrical AC network, such as, for example, an asynchronous machine, a synchronous machine, a synchronous machine with damper cage, or the like, or also direct current machines, such as, for example, shunt machines or series machines, or the like.

The rotor and/or the stator of the rotating electric machine usually have a laminated core. The laminated core is generally formed from a ferromagnetic, permeable material, so that it is able to guide the magnetic flux effectively. Frequently, the laminated core consists of a plurality of individual ferromagnetic metal sheets, which are electrically insulated from one another. The laminated core may also be formed from a different ferromagnetic material, however, for example from a ferrite, or the like. Depending on the intended use, if sheet metal is used, it can also be referred to as electrical sheet steel, engine sheet, transformer sheet or the like. Sheet metal of this kind is covered by standards, for example EN 10106, EN 10107 or the like.

On the air gap side, in a peripheral direction which coincides with a direction of rotation of the rotor during intended operation of the electric machine and is traverse to the longitudinal direction, the laminated core forms axial teeth, which often extend substantially in the longitudinal direction, i.e. they generally extend substantially in parallel with an axis of rotation of the rotor. This means that the teeth form slots, which are used to accommodate the at least one rotor of the at least one winding. By way of the at least one winding, it is possible to provide at least some of the magnetic flux which is necessary for the intended operation of the rotating electric machine.

Electric machines with slots of this kind are known, for example, from US 2011/210 692 A1, from DE 10 2014 111 239 A1, from US 2004/212 256 A1 as well as from DE 10 2016 114 569 A1. In this context, the applications mentioned also show different designs of the slots.

Generally, the stator absorbs a response in relation to a rotor torque and supports itself against a contact area, at which the stator is fastened in a torsion resistant manner. The supporting can be formed by a foundation or the like.

The laminated core therefore refers to a body which is produced from a ferromagnetic material and is thus magnetizable, preferably assembled in layers. The object of the laminated core consists inter alia in guiding or grouping the magnetic flux in conjunction with at least one current-carrying winding.

Depending upon the construction of the rotating electric machine, it is possible for the laminated core to be provided both on the rotor side and on the stator side. A combination, in which a laminated core is provided on the stator side and also on the rotor side, is also possible.

The teeth generally extend in a longitudinal direction of the rotor or the stator. Although their longitudinal axis is often in parallel with the axis of rotation of the rotor, the orientation of the extension of the teeth may also deviate from the orientation of the axis of rotation of the rotor or the longitudinal direction, for example in a beveled design.

Usually, the laminated core has a cover unit arranged on the air gap side, which delimits the slots formed by the teeth in the radial direction on the air gap side. This makes it possible, for example in the rotor, to fix the electrical conductor arranged in the slot during intended operation of the rotating electric machine, and/or the like.

As a result, on the air gap side in the region of the slot, it is possible to achieve a reduced magnetic conductivity compared to the magnetic conductivity of the laminated core, whereby the function of the rotating electric machine is improved.

Generally, in a region of the respective slot, the cover unit has at least one tapering region, in which the material of the cover unit, which generally corresponds to the material of the laminated core, is thinner in a radial direction of the laminated core than in a region of the cover unit adjoining said tapering region. As a result, it can be achieved that, during intended operation of the rotating electric machine, the material of the cover unit at the tapering region only reaches saturation when a corresponding magnetic flux is intended to be guided. This can be used to improve the effect of the rotating electric machine.

Particularly in asynchronous machines, it has been shown that an undesirable torque ripple may occur during intended operation. In order to reduce this, it is often provided to embody the slots formed by the teeth in a beveled manner, in order to be able to achieve a better torque ripple value or a reduced torque ripple as a result.

The torque ripple value may inter alia be dependent upon the number and the formation of the poles of the rotor or of the stator that are formed by the at least one winding. Due to the slots being beveled, the torque ripple can be reduced during intended operation of the rotating electric machine or asynchronous machine. The beveling has the disadvantage, however, that this exhibits a torque loss, which may amount to from approx. 3% to approx. 5%, for example.

Moreover, the beveling of the slots may lead to a torque limit being reduced in an asynchronous machine in a field-weakening range. This results in, for example, a limit rating and therefore also an acceleration capability possibly being reduced accordingly.

The object underlying the invention is to reduce the torque ripple during intended operation of the rotating electric machine, and specifically preferably independently of a beveling of slots.

SUMMARY OF THE INVENTION

As a solution, the invention proposes a laminated core, a stator, a rotor as well as a rotating electric machine in accordance with the independent claims.

Advantageous developments are disclosed by the features of the dependent claims.

With regard to a generic laminated core, the invention in particular proposes that, in the region of the respective slot, at least two tapering regions are formed, which are spaced apart from one another in the peripheral direction of the laminated core.

With regard to a generic stator, it is proposed in particular that the stator has a laminated core according to the invention.

With regard to a generic rotor, it is proposed in particular that the rotor has a laminated core according to the invention.

In relation to a generic rotating electric machine, it is proposed in particular that the stator and/or the rotor are embodied according to the invention.

The invention is based inter alia on the idea that the torque ripple may be dependent upon the number of tapering regions. In the prior art, a single tapering region is provided for each of the slots in each case. This may, however, result in a large torque ripple during intended operation of the rotating electric machine. As a result of at least two tapering regions spaced apart from one another now being provided for a respective slot according to the invention, the torque ripple can be reduced accordingly. The reduction of the torque ripple can therefore be achieved without a beveling of the slots being necessary. This makes it possible for the disadvantages associated with the beveling, in particular on the performance capability with regard to the rotating electric machine, especially in asynchronous machines, to be able to be largely avoided. Depending on the construction of the laminated core, it is of course possible for more than two tapering regions to be provided, spaced apart from one another for each slot. It is possible for the torque ripple to be further reduced by the number of tapering regions accordingly.

The cover unit may be arranged radially on the outside of the teeth. In this context, it may be provided that the cover unit fully covers the teeth in the direction of the air gap. In particular, the shape of the slot in the direction of the air gap can be fully given by the design of the cover unit. In other words, it is possible for the cover unit to be exclusively arranged radially on the outside of the slots. This means that the slots may be covered exclusively by the cover unit in the direction of the air gap.

Even if it is no longer necessary, according to the invention, to provide a beveling, the invention can nevertheless of course also be combined with a beveling, in order to be able to achieve further particular technical effects, for example. On the whole, the invention makes it possible to achieve that the load capacity or performance capability of the rotating electric machine can be improved.

The tapering region preferably extends in the peripheral direction and in the longitudinal extension direction of the slot. In the peripheral direction, the dimensions of the tapering region are preferably smaller than the width of the respective slot.

The tapering region of the cover unit is therefore a region which preferably extends hi the longitudinal/extension direction of the respective slot and in which a material cross-section provided hi the longitudinal extension direction and in the radial direction is smaller than in regions immediately adjacent in the peripheral direction.

Overall, the tapering regions may preferably be embodied in a substantially identical manner. Depending on the machine construction or construction of the laminated core, however, it may also be provided for the at least two tapering regions to also be embodied in a manner in which they differ from one another. This means that the magnetic flux can be influenced in a targeted manner as required during intended operation of the rotating electric machine.

The invention therefore makes it possible to be able to reduce the torque ripple or simultaneously to increase the performance capability of the rotating electric machine accordingly, without having to interfere with the external mechanical dimensions of the rotating electric machine.

The cover unit can be embodied in one piece with the teeth. It may also, however, be embodied as a separate component, and preferably fastened to the respective teeth on the air gap side. For example, the cover unit can therefore be embodied in a multi-part manner, for example by one element of the cover unit being provided for a respective tooth and being able to be arranged thereon on the air gap side. For this purpose, it may be provided that the cover unit, following installation of the at least one winding, is fastened to the teeth on the air gap side, for example by means of a screwed connection, an adhesive connection, a welded connection and/or the like.

It is further proposed that the cover unit in each case has at least one of the at least two tapering regions in a region of a respective slot wall of a respective slot which extends radially and in a longitudinal direction of the laminated core. As a result, the tapering regions are arranged in the region of the respective slot walls of a respective slot and are spaced far apart from one another. As a result, a particularly favorable reduction of the torque ripple can already be achieved with only two tapering regions. Of course, further tapering regions may also be provided depending on the construction.

One development proposes that the cover unit has a slot gap, which extends in a longitudinal extension direction of the respective slot, on the air gap side for each of the slots, wherein the cover unit preferably has the slot gap of the respective slot in the middle with regard to a width of the slot in the peripheral direction. The cover unit preferably provides a slot gap, which extends in the longitudinal extension direction of the respective slot, on the air gap side for each of the slots. The slot gap can be embodied as a further air gap and then can preferably be connected to the air gap of the electric machine. In addition, a non-ferromagnetic material may also at least partially be arranged in the slot gap. The tapering region preferably extends not only in the peripheral direction and in the longitudinal extension direction of the slot, but in particular in the direction of the slot gap, particularly preferably in parallel therewith.

As a result, it can be achieved that the effect of the invention may be substantially independent of the direction of rotation of the rotor in relation to the stator. It has proven to be particularly advantageous if the cover unit according to the invention is arranged on a rotor. However, advantages may also be produced when arranged on a stator. Moreover, in this manner, the cover unit may be embodied symmetrically with regard to its positioning on a respective one of the teeth, in particular if the cover unit is embodied in multiple parts.

It is furthermore proposed that the tapering regions are embodied by an angular contour of the cover unit. The angular contour makes it possible to produce the cover unit in a simple and cost-effective manner.

It is furthermore proposed that the tapering regions are embodied by a curved contour of the cover unit. The curved contour may, for example, be formed by a curvature with a constant or also a variable radius, or the like. Of course, the curved contour may also be embodied in a manner combined with the angular contour. The curved contour makes it possible to improve in particular the mechanical load capacity or strength of the cover unit. In particular, the stability of the cover unit can be improved, so that a high load capacity can be achieved especially when it is used in a rotor.

It is furthermore proposed that the material of the cover unit in the radial direction of the laminated core is thinner in the region of the tapering regions of a respective slot than in a region of the slot gap for said slot. As a result, it can be achieved that, with a substantially homogeneous material for the cover unit, a saturation of the material is improved in the region of the slot gap compared to the tapering due to the effect of the magnetic flux. Due to this construction, it is possible to achieve that the saturation first occurs in the region of the tapering. Overall, the reduction of the torque ripple can be further improved as a result.

It is furthermore proposed that the material of the cover unit has a lower ferromagnetic permeability than the teeth, at least in the region of the respective tapering regions. In principle, the cover unit can of course have a lower ferromagnetic permeability than that of the teeth overall. As a result, the guiding of the magnetic flux through the laminated core can be further optimized. Moreover, for the cover unit, it is possible to use a material which only shows saturation effects with a greater magnetic flux density than the material of the teeth. As a result, it is possible to reduce losses in the region of the cover unit.

One development provides that, in an axial cross-section through the laminated core, the respective slot is delimited by two sides of a notional triangle, wherein corners of a further, third side of the notional triangle are congruent with air-gap-side corners of the respective slot and a height of the notional triangle runs in parallel with and partially identically to a geometric radial line of gravity of the respective slot in the axial cross-section, and wherein a tip of the notional triangle points away from the air gap. Preferably, the notional triangle is shaped as an isosceles triangle. In this case, it is preferably provided that, in an axial cross-section through the laminated core, the respective slot is delimited by equally long legs of the notional isosceles triangle, wherein corners of a base of the notional triangle are congruent with air-gap-side corners of the respective slot and a height of the notional triangle runs in parallel with and partially identically to a geometric radial line of gravity of the respective slot in the axial cross-section, and wherein a tip of the notional triangle points away from the air gap. In other words, the respective slot is delimited toward the air gap by the two sides or legs of the notional triangle. The corners of the triangle adjoining the third side or the base of the triangle are in this context in particular congruent in relation to the corners of the respective slot which are closest to the air gap. In this present context, "congruent" may mean coincident or with the same position. In the case of an isosceles notional triangle, the third side corresponds to the base. The delimitation at the two sides or legs of the triangle may be provided by the laminated core, in particular the cover unit. This shape enables an especially effective conducting of the magnetic flux through the laminated core.

One development provides that, hi an axial cross-section through the laminated core, in particular the cover unit, an air-gap-side delimitation of the respective slot is shaped in a V-like manner and a radial widening of the respective slot increases toward the edges of the V-shaped delimitation. The V-shaped delimitation may in particular be formed by the two sides or legs of the notional triangle. For this reason, this also enables an especially effective conducting of the magnetic flux through the laminated core.

One development provides that the delimitation at the notional triangle or the air-gap-side delimitation of the respective slot is partially or fully provided by the cover unit. Thus, in some embodiments, the corresponding delimitation may only be provided partially by the cover unit and additionally partially by another element of the laminated core. In other embodiments, the corresponding delimitation is fully provided by the cover unit. This enables the conducting of the magnetic flux to be advantageously adapted to the individual case in each instance.

In accordance with one development, it is provided that, in an axial cross-section through the laminated core, the cover unit in the region of the respective slot is shaped at least approximately in a manner corresponding to a triangle, optionally interrupted by a slot gap oriented in the radial and axial direction, wherein one side of the triangle runs at least substantially in parallel with the peripheral direction of the laminated core and two other sides of the triangle point into the respective slot. In other words, the triangle, according to which the cover unit is formed, is interrupted or divided by the slot gap. Therefore, the triangle mentioned can be composed of two smaller triangles spaced apart by the slot gap. "At least substantially in parallel with the peripheral direction" in the above sense means that the orientation of the triangle has an orientation which is in parallel with the peripheral direction to the greatest possible extent. Due to the curvature of the peripheral direction, however, this is only possible in an approximate manner. For example, the corresponding side of the triangle may be oriented according to an average orientation of the receiving direction in the region of the triangle. The triangle described here may correspond to the notional triangle described above, in particular with regard to the position and orientation thereof. Due to the shape of the cover unit described here, the magnetic flux can be conducted in an even more effective manner.

The triangle, according to which the cover unit is embodied in the region of the respective slot, may advantageously be an isosceles triangle. In this case, a base of the isosceles triangle runs in parallel with the peripheral direction of the laminated core and two limbs of the triangle point into the respective slot, wherein in particular the slot gap runs in parallel with and partially coinciding with the height of the triangle. Thus, in the case of the isosceles triangle, this may also correspond to the notional triangle mentioned above, in particular with regard to the position and orientation thereof. This development is based on the knowledge that a symmetrical, in the case of the isosceles triangle, or asymmetrical embodiment may result in an improved conducting of the magnetic flux in an individual case.

The advantages and effects specified for the laminated core according to the invention also equally apply to the stator according to the invention, the rotor according to the invention as well as the electric machine according to the invention, and vice versa.

DESCRIPTION OF THE DRAWING

Further advantages, effects and features are disclosed by the following description of exemplary embodiments on the basis of the accompanying figures. In the figures, the same reference characters denote the same features and functions.

In the drawings.

DETAILED DESCRIPTION OF PREFERRED EMBODIMENTS

Figure 1:
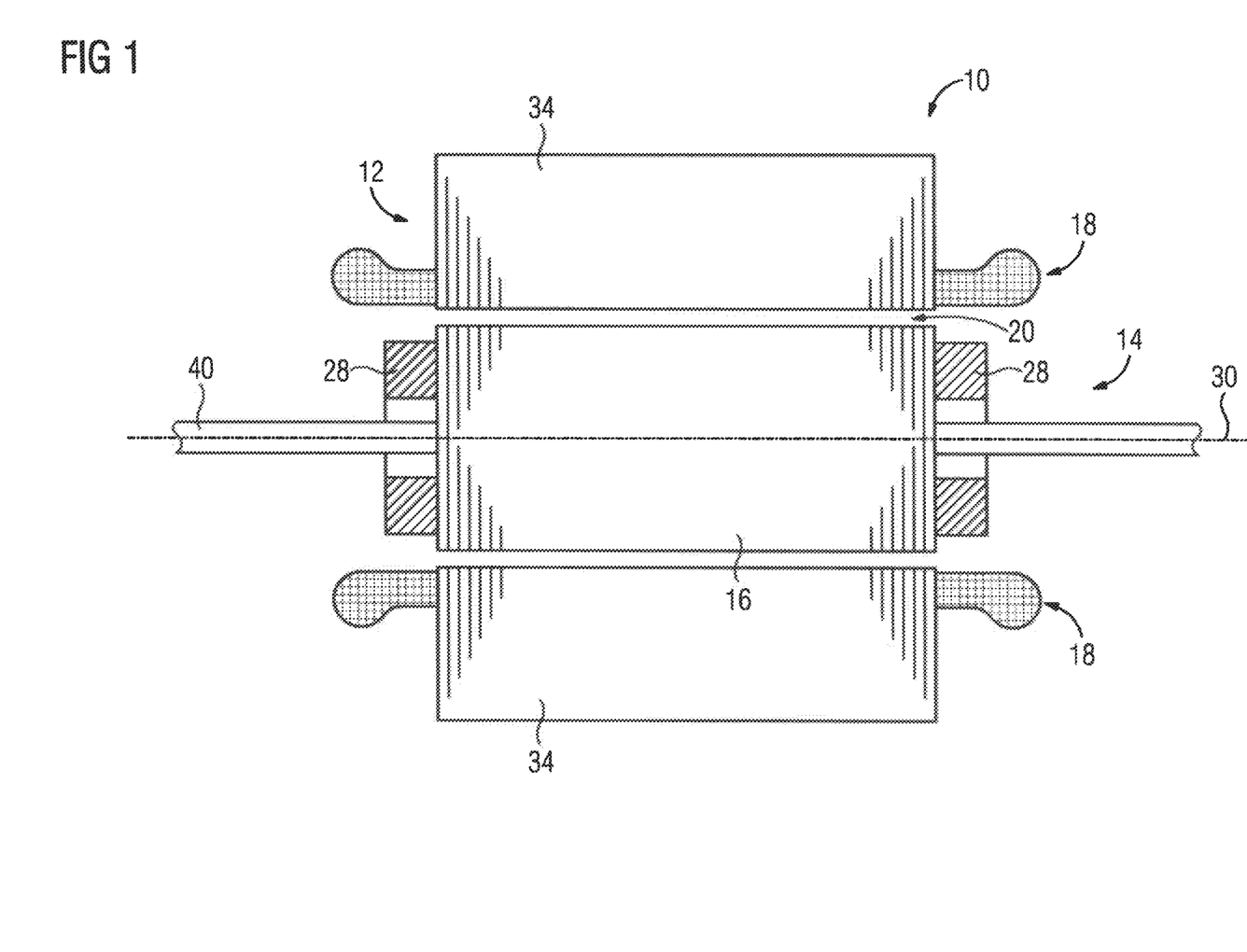
FIG. 1 shows a schematic sectional view of a rotating electric machine along an axis of rotation of a rotor of the rotating electric machine, which is mounted such that it can rotate in relation to a stator.

FIG. 1 shows a schematic sectional representation of a rotating electric machine in the form of an asynchronous machine 10, which is embodied for connection to a three-phase AC network and which has a stator 12, which is arranged in a torsion-resistant manner. The stator 12 has a central through opening (not labeled), in which a rotor 14 is arranged such that it is rotatably mounted about an axis of rotation 30.

The stator 12 further has a laminated stator core 34, in which, by way of teeth 22 of the laminated stator core 34 arranged in a peripheral direction 56, slots 26 are embodied which extend substantially in parallel with the axis of rotation 30. In alternative embodiments, the teeth may also be arranged in a beveled manner.

An electrical conductor 36 is arranged in the slots 26, represented in a schematic manner. The electrical conductor 36 forms a stator winding. The stator winding is therefore arranged in the laminated stator core 34. In FIG. 1, it is possible to see winding overheads 18 which protrude lengthwise beyond the laminated stator core 34. In the present case, the section in FIG. 1 is a longitudinal section along the axis of rotation 30 of a rotor 14, which in the present case is embodied as a squirrel cage rotor and which is arranged in the through opening (not labeled) of the laminated stator core 34.

The rotor 14 is arranged such that it can rotate in the asynchronous machine 10 and is fixed in its position in relation to the stator 12 such that it can rotate via a bearing (not shown in further detail), which for example may be formed by end shields. In the installed state, an air gap 20 is formed between the stator 12 and the rotor 14.

During intended operation of the asynchronous machine 10, the rotor 14 can be rotated about an axis of rotation 30.

The rotor 14 has a laminated rotor core 16, which comprises an electrical conductor 38, which represents a rotor winding (not labeled further). In the present case, the electrical conductors 38 are embodied as rods, which are short-circuited at the end-face ends of the laminated rotor core 16 by means of short-circuit rings 28. As a result, the electrical conductors 38 are electrically coupled to one another, in order to form cages.

Furthermore, the rotor 14 has a rotor shaft 40, which is used to mechanically connect to a rotatable mechanical facility. The rotatable mechanical facility may have any given function, for example a drive function for an industrial machine, a motor vehicle which can be driven electrically and/or the like. Moreover, the mechanical facility may of course also be an internal combustion engine, a wind turbine and/or the like. Depending on the mode of operation, the squirrel cage rotor 14 can be supplied with mechanical energy in the form of a rotational movement or a torque, so that the asynchronous machine 10 can be operated in a generator mode. However, it may also draw electrical energy by way of the electrical power supply network connected to it and provide a torque via the rotor 14 and the rotor shaft 40 during motor operation.

Figure 2:
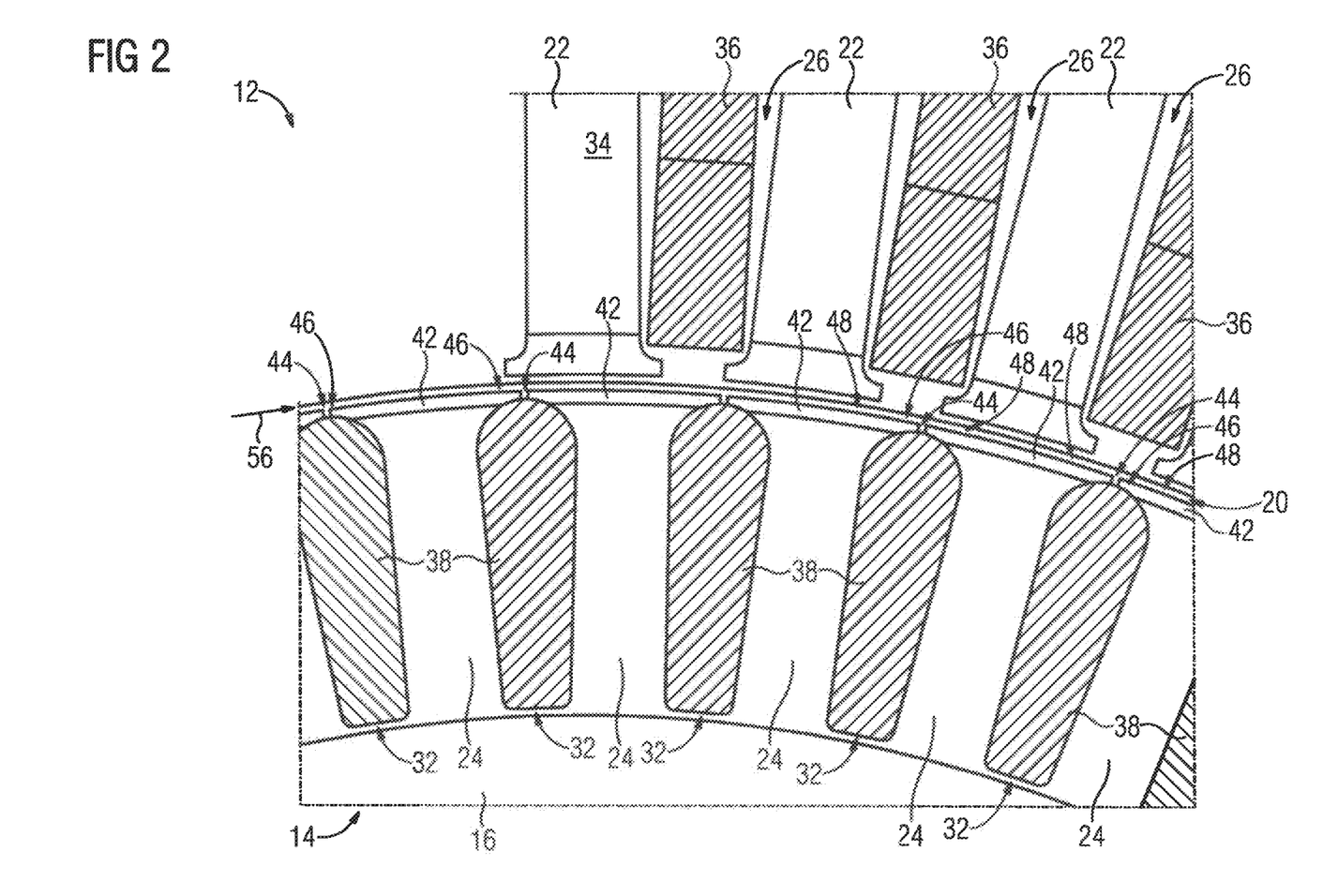
FIG. 2 shows a cutout of a schematic sectional representation of the rotating electric machine in accordance with FIG. 1 in a radial direction transverse to the axis of rotation in accordance with a first embodiment of a laminated core of the rotor.

FIG. 2 shows, in a schematic sectional representation transverse to the axis of rotation 30, a cutout of the rotor 14 which is mounted such that it can rotate in relation to the stator 12. It can be seen that the stator 12 comprises the laminated stator core 34, which provides the teeth 22 in the peripheral direction 56 which form the stator-side slots 26, in which the electrical conductor 36 is arranged. This representation is merely schematic. The electrical conductor 36 may be formed by a plurality of individual conductors, which can be embodied according to requirements, for example in the shape of a rod, a strip and/or the like. Cross-sections of the conductors 36 can also be embodied accordingly.

It can be seen from FIG. 2 that the same also applies to the rotor 14 in principle. The rotor 14 comprises the laminated rotor core 16, which provides teeth 24 in the peripheral direction 56 which form the rotor-side slots 32. The electrical conductor 38 is arranged in the rotor-side slots 32. As with the electrical conductor 36, the electrical conductor 38 may also be embodied on the stator side.

As can be seen in FIG. 2, the laminated rotor core 16 has a cover unit 42 on the air gap side, which in the present case is formed from separate individual cover elements. The cover unit 42 delimits the slots 32 in the radial direction. At the same time, for each of the slots 32, the cover unit 42 provides a respective slot gap 44, which in the present case is also embodied as an air gap in the same way as the air gap 20 and is connected to the air gap 20. The slot gap 44 extends in a longitudinal extension direction of the respective slot 32. In the present case, the longitudinal extension direction is parallel with the axis of rotation 30. In alternative embodiments, however, a beveling may be provided.

Figure 4:
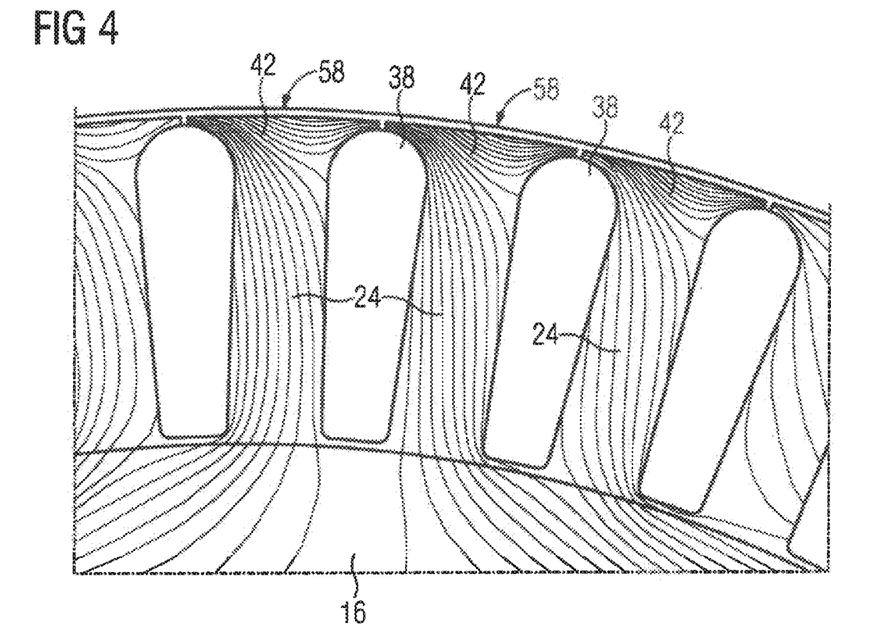
FIG. 4 shows a schematic sectional representation, as in FIG. 2, with field lines to represent a magnetic flux during intended operation in accordance with the first embodiment of the laminated core of the rotor.

In one region of a respective slot 32, the cover unit 42 has a tapering region 46, in which a material of the cover unit 42 is thinner in a radial direction of the laminated core 16 than in a region 48 adjoining said tapering region 46. FIG. 4 shows, in a schematic representation based on FIG. 2, how the magnetic flux is formed in the rotor 14 during intended operation of the asynchronous machine 10 for the rotor 14, on the basis of field lines 58. It can be seen that an especially high magnetic flux density occurs in the region of the slot gaps 44. This flux concentration leads to the formation of a torque ripple, which is often undesirable.

Figure 3:
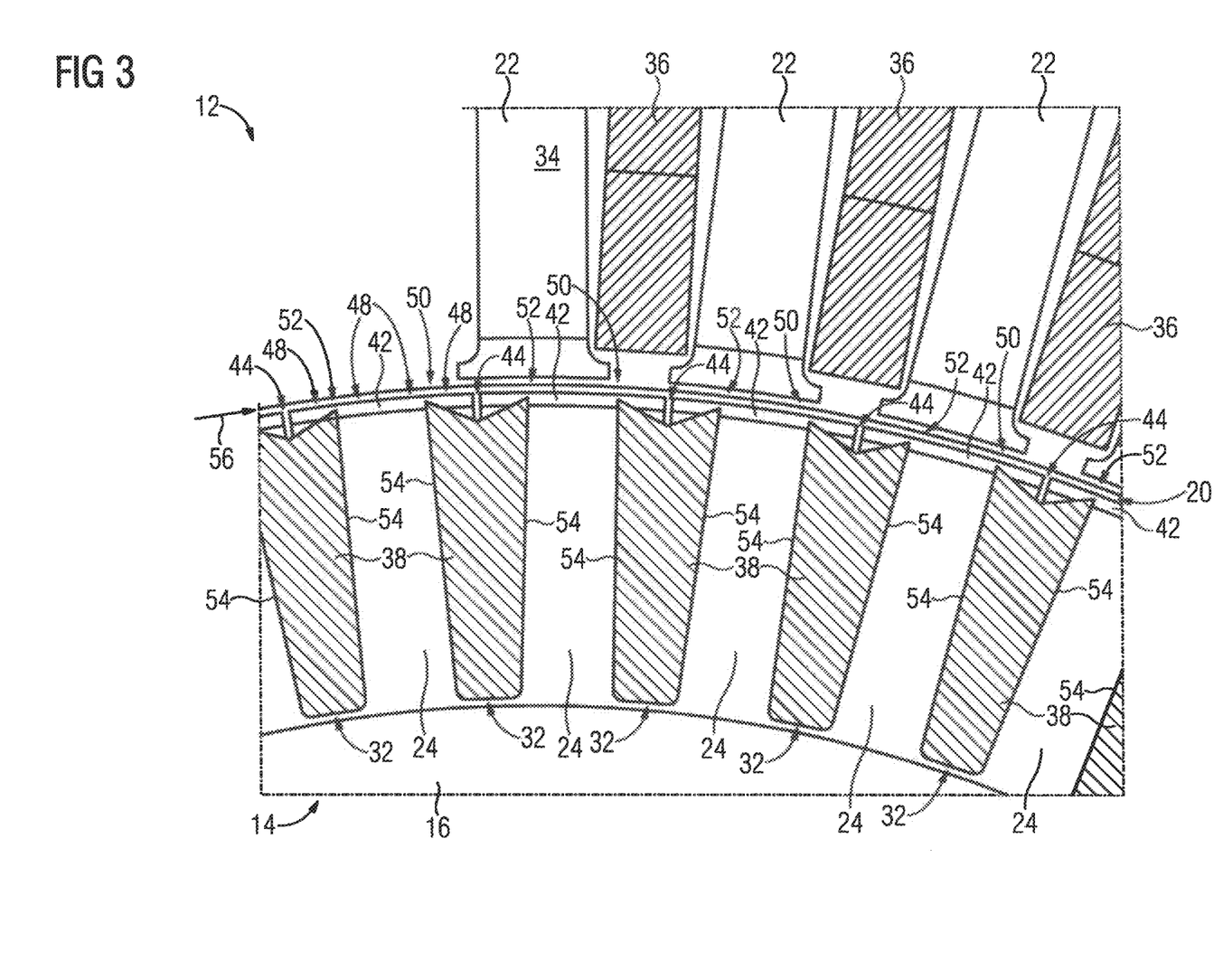
FIG. 3 shows a schematic sectional representation of the rotating electric machine in accordance with FIG. 1, as in FIG. 2, in a radial direction transverse to the axis of rotation in accordance with a second embodiment of a laminated core of the rotor.

FIG. 3 now shows, in a schematic representation as in FIG. 2, a formation of the cover unit 42 which makes it possible to reduce the torque ripple in accordance with the embodiment in FIG. 2. In the following, only the differences of the embodiment in FIG. 3 compared to the embodiment in FIG. 2 are explained.

It can be seen from FIG. 3 that the cover unit 42 is formed differently compared to the cover unit 42 in FIG. 2. In accordance with FIG. 3—in contrast to the cover unit 42 in FIG. 2—for the region of the respective slot 32, the cover unit 42 now namely provides in each case two tapering regions 50, 52 spaced apart from one another in the peripheral direction 56 of the laminated core 16. The further structural features substantially correspond to that which has already been explained in relation to PG 2, for which reason reference is additionally made to the statements relating thereto.

The cover unit 42 has at least one of the at least two tapering regions 50, 52 in a region of a slot wall 54 of the respective slot 32 which region of the slot wall 54 extends radially and in a longitudinal direction of the laminated core 16. As a result, the tapering regions 50, 52 are arranged in the region of the slot walls 54 of the respective slot 32 and are spaced far apart from one another.

Due to this formation of the cover unit 42, it is possible to achieve that two tapering regions 50, 52 are now provided for each of the slots 32, so that the magnetic flux also varies accordingly during intended operation of the asynchronous machine 10. This is shown schematically on the basis of FIG. 5.

Figure 5:
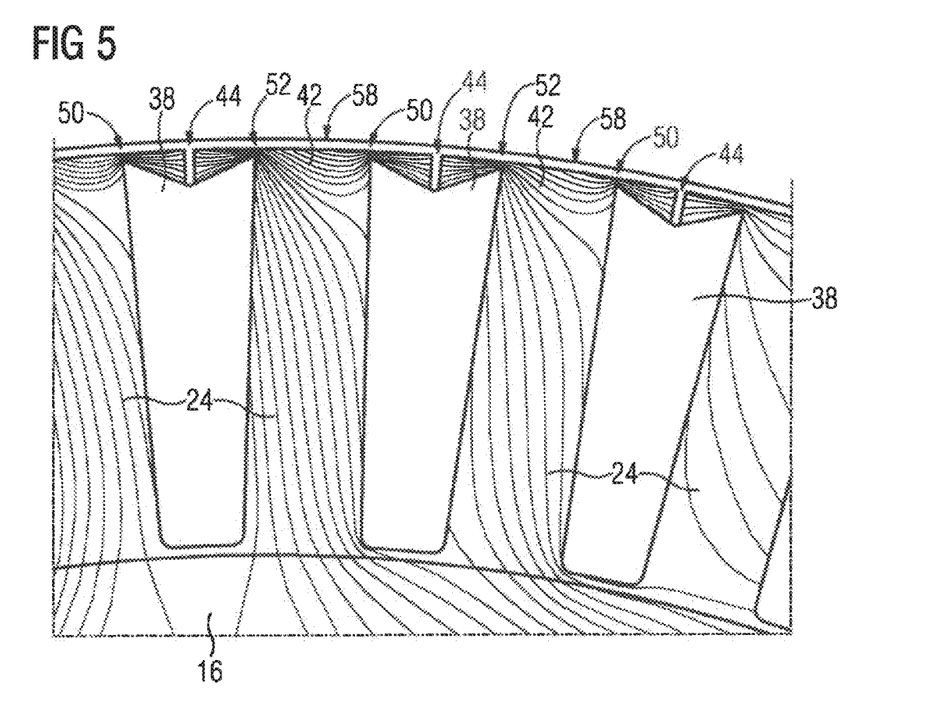
FIG. 5 shows a schematic sectional representation, as in FIG. 3, with field lines to represent a magnetic flux during intended operation in accordance with the second embodiment of the laminated core of the rotor.

It can be seen from FIG. 5 that the magnetic flux is now concentrated at the two tapering regions 50, 52 of the cover unit 42. As a result, the number of regions to which a high flux density is applied increases, as a result of which the torque ripple can be reduced overall. This also shows that the torque ripple can be reduced even further by further increasing the number of tapering regions for a respective slot 32.

Figure 6:
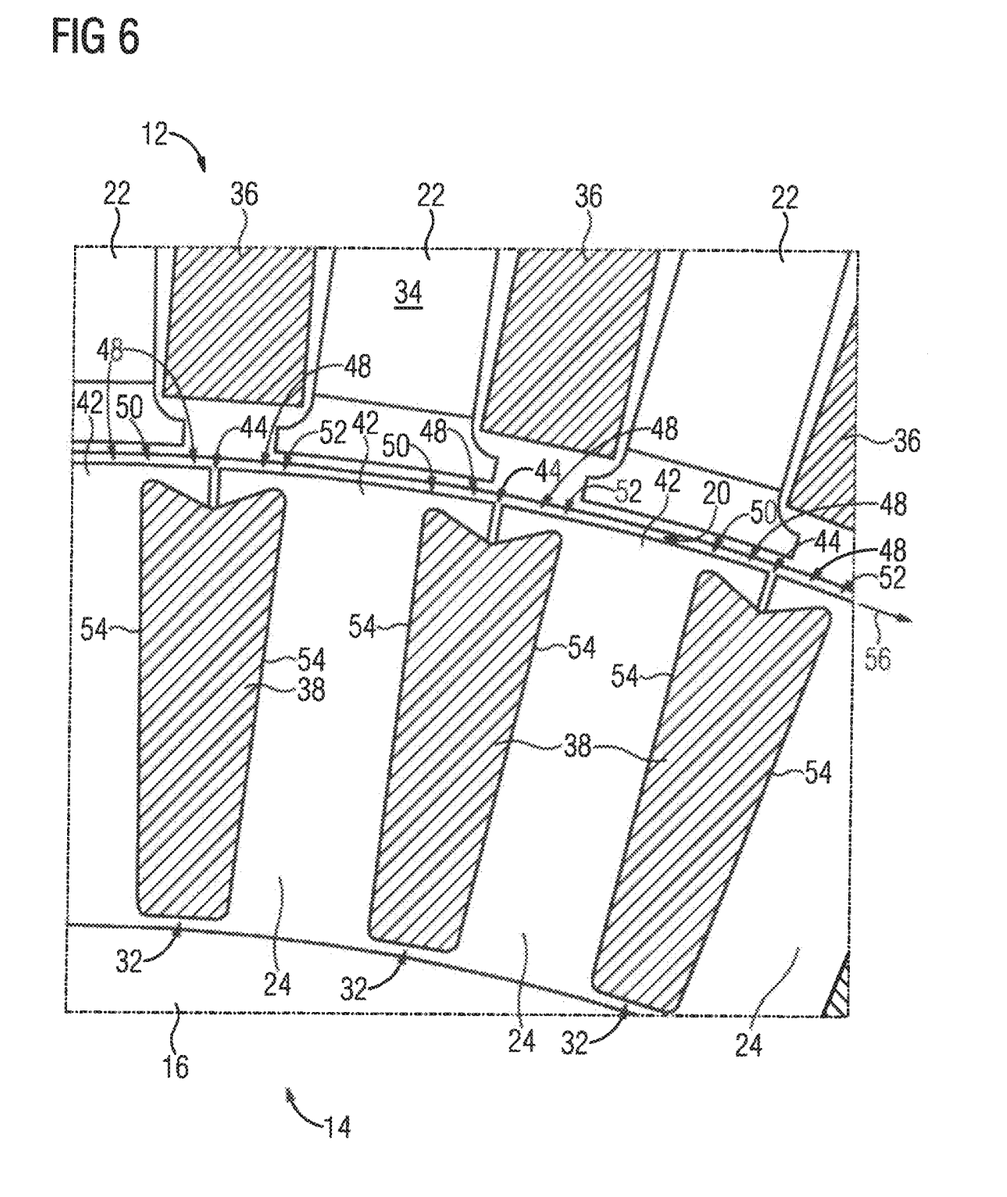
FIG. 6 shows a schematic sectional representation, as in FIG. 3, for a third embodiment of a laminated core of the rotor.

In FIG. 3, the tapering regions 50, 52 are realized by an angular formation of the cover unit 42. FIG. 6 shows, in a schematic representation as in FIG. 3, an alternative embodiment in which the tapering regions 50, 52 have a round contour. As a result, an improved stability and possibly also an improved guiding of the magnetic flux can be achieved. In principle, however, the effect is comparable with the effect of the embodiment on the basis of FIG. 3, for which reason reference is made to the corresponding embodiments in this regard.

The following table shows comparison values for a predefined asynchronous machine.

|  | New slot (invention) | Standard | Ratio new/standard | New slot extrapolated |
|---|---|---|---|---|
| n [rpm] | 4000 | 4000 |  | 4000 |
| I1 [A] | 57.7 | 57.7 |  | 57.7 |
| S [%] | 1.95 | 1.95 |  | 1.95 |
| M[Nm] | 63.93 | 65.85 |  | 66.16 |
| Pv_solid[W] | 628 | 698 | 90% |  |
| Pv_Fe[W] | 503 | 552 | 91% |  |
| M_wellSS[Nm] | 5 | 9 | 56% |  |
| M_wellSS[%] | 7.82 | 13.67 | 57% |  |
| I2 [ASS] | 430 | 445 |  | 445 |
| n [rpm] | 750 | 750 |  | 750 |
| I1 [A] | 117.2 | 117.2 |  | 117.2 |
| S [%] | 4.33 | 4.33 |  | 4.33 |
| M[Nm] | 524.2 | 539.9 |  | 544.62 |
| Pv_solid[W] | 1803 | 1835 | 98% |  |
| Pv_Fe[W] | 281 | 292 | 96% |  |
| M_wellSS[Nm] | 10 | 61 | 16% |  |
| M_wellSS[%] | 1.91 | 11.30 | 17% |  |
| I2 [ASS] | 770 | 800 |  | 800 |

The table above shows a comparison of two operating states, which differ from one another due to a respective rotational speed, of an asynchronous machine according to the invention and of an asynchronous machine according to the prior art. The acronyms used in the table are assigned as follows:

n rotational speed
I1 stator current
s slip
m output torque
Pv_solid ohmic losses
Pv_FE iron losses
M_wellSS torque ripple (peak-to-peak)
I2 rotor current (peak-to-peak)

The slip refers to a ratio of the rotor frequency in relation to the stator frequency.

It can be seen from the table that, by way of the laminated core according to the invention, the performance capability of the asynchronous machine can be increased without having to increase the external dimensions thereof. As a result, an improved performance capability of the asynchronous machine can be achieved with the same installation size. Even though the table only shows this topic for an exemplary asynchronous machine, corresponding advantages can also be achieved by the invention for other electric machines.

The exemplary embodiments shown in the figures are exclusively used to explain the invention and are not intended to limit it.

What is claimed is:

1. A laminated core for a rotor and/or a stator of a rotating electric machine, said laminated core comprising:
   teeth arranged adjacent to one another in a peripheral direction of the laminated core to delimit slots for accommodating an electrical conductor that forms a winding; and
   a cover unit arranged on a side of an air gap between the rotor and the stator and delimiting each of the slots in a radial direction, said cover unit having in a region of a respective one of the slots at least two tapering regions which are spaced apart from one another in the peripheral direction of the laminated core, with a material of the cover unit being thinner in the at least two tapering regions in a radial direction of the laminated core than in a region of the cover unit adjoining the at least two tapering regions,
   wherein, in an axial cross-section through the laminated core, the respective slot is delimited on the air gap side by two equally long legs of a notional isosceles triangle having a base with corners of the base being congruent with air-gap-side corners of the respective slot, and with a height of the notional triangle running in parallel with and partially identically to a geometric radial line of gravity of the respective slot in the axial cross-section, and wherein the notional triangle has a tip which points away from the air gap.

2. The laminated core of claim 1, wherein at least one of the at least two tapering regions of the cover unit is formed in a region of a slot wall of the respective slot, which region of the slot wall extends radially and in a longitudinal direction of the laminated core.

3. The laminated core of claim 1, wherein the cover unit is configured to exhibit a slot gap, which extends in a longitudinal extension direction of the respective slot on the air gap side.

4. The laminated core of claim 3, wherein the slot gap is formed centrally with regard to a width of the respective slot in the peripheral direction of the laminated core.

5. The laminated core of claim 3, wherein the material of the cover unit in the radial direction of the laminated core is thinner in a region of the tapering regions of the respective slot than in a region of the slot gap.

6. The laminated core of claim 1, wherein the at least two tapering regions are formed by an angular contour of the cover unit.

7. The laminated core of claim 1, wherein the at least two tapering regions are formed by a curved contour of the cover unit.

8. The laminated core of claim 1, wherein the material of the cover unit has a ferromagnetic permeability which is lower than a ferromagnetic permeability of the teeth, at least in the at least two tapering regions.

9. The laminated core of claim 1, wherein, in an axial cross-section through the laminated core, an air-gap-side delimitation of the respective slot is shaped in a V-like manner and a radial widening of the respective slot increases toward edges of the V-shaped delimitation.

10. The laminated core of claim 9, wherein the cover unit is configured to partially or fully provide a delimitation at the notional triangle or the air-gap-side delimitation of the respective slot.

11. The laminated core of claim 1, wherein, in an axial cross-section through the laminated core, the cover unit is shaped in a region of the respective slot at least approximately in a manner corresponding to a triangle, with one side of the triangle running at least substantially in parallel with the peripheral direction of the laminated core and two other sides of the triangle pointing into the respective slot.

12. The laminated core of claim 11, wherein the cover unit is configured to exhibit a slot gap, which extends in radial and axial directions of the respective slot on the air gap side, said triangle being interrupted by the slot gap.

13. The laminated core of claim 12, wherein the triangle is an isosceles triangle having a base which runs in parallel with the peripheral direction of the laminated core, and two limbs which point into the respective slot.

14. The laminated core of claim 13, wherein the slot gap runs in parallel with and partially coincides with a height of the triangle.

15. A rotating electric machine, comprising:
   a stator; and
   a rotor mounted for rotation in an opening of the stator and arranged in spaced-apart relation to the stator to define an air gap there between,
   wherein at least one of the stator and the rotor includes a laminated core as set forth in claim 1.

16. A stator for a rotating electric machine, comprising a laminated core, said laminated core comprising teeth arranged adjacent to one another in a peripheral direction of the laminated core to delimit slots for accommodating an electrical conductor that forms a winding, and a cover unit arranged on a side of an air gap between a rotor of the electric machine and the stator and delimiting each of the slots in a radial direction, said cover unit having in a region of a respective one of the slots at least two tapering regions which are spaced apart from one another in the peripheral direction of the laminated core, with a material of the cover unit being thinner in the at least two tapering regions in a radial direction of the laminated core than in a region of the cover unit adjoining the at least two tapering regions, wherein, in an axial cross-section through the laminated core, the respective slot is delimited on the air gap side by two equally long legs of a notional isosceles triangle having a base with corners of the base being congruent with air-gap-side corners of the respective slot, and with a height of the notional triangle running in parallel with and partially identically to a geometric radial line of gravity of the respective slot in the axial cross-section, and wherein the notional triangle has a tip which points away from the air gap.

17. A rotor for a rotating electric machine, comprising a laminated core, said laminated core comprising teeth arranged adjacent to one another in a peripheral direction of the laminated core to delimit slots for accommodating an electrical conductor that forms a winding, and a cover unit arranged on a side of an air gap between the rotor and a stator of the electric machine and delimiting each of the slots in a radial direction, said cover unit having in a region of a respective one of the slots at least two tapering regions which are spaced apart from one another in the peripheral direction of the laminated core, with a material of the cover unit being thinner in the at least two tapering regions in a radial direction of the laminated core than in a region of the cover unit adjoining the at least two tapering regions, wherein, in an axial cross-section through the laminated core, the respective slot is delimited on the air gap side by two equally long legs of a notional isosceles triangle having a base with corners of the base being congruent with air-gap-side corners of the respective slot, and with a height of the notional triangle running in parallel with and partially identically to a geometric radial line of gravity of the respective slot in the axial cross-section, and wherein the notional triangle has a tip which points away from the air gap.

* * * * *